United States Patent
Schroeder et al.

(10) Patent No.: US 6,463,271 B1
(45) Date of Patent: *Oct. 8, 2002

(54) PORTABLE RADIO TELEPHONE DATA TERMINAL USING CDPD

(75) Inventors: Martin K. Schroeder, San Diego; Yorgos M. Peponides, Encinitas; Michael L. Lubin, Del Mar, all of CA (US)

(73) Assignee: Cirrus Logic, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 08/481,627

(22) Filed: Jun. 7, 1995

Related U.S. Application Data (63) Continuation-in-part of application No. 08/117,913, filed on Sep. 8, 1993, now abandoned.

(51) Int. Cl.⁷ .............................................. H04M 11/00
(52) U.S. Cl. ...................................................... 455/404
(58) Field of Search .......................... 379/58; 370/58.1; 375/261; 455/404

(56) References Cited

U.S. PATENT DOCUMENTS

| | | |
|---|---|---|
| 3,564,150 A | 2/1971 | Muller |
| 3,575,558 A | 4/1971 | Leyburn et al. |
| 3,627,955 A | 12/1971 | Stone, Jr. |

(List continued on next page.)

FOREIGN PATENT DOCUMENTS

| | | |
|---|---|---|
| CA | 2063901 | 9/1992 |
| EP | 0259129 | 3/1988 |
| EP | 0 439926 A2 | 8/1991 |
| EP | 0473297 A2 | 3/1992 |
| EP | 514360 A2 | 11/1992 |
| EP | 0521601 A3 | 1/1993 |
| EP | 0521609 | 1/1993 |
| GB | 2239567 | 7/1991 |
| GB | 2241854 A | 9/1991 |
| GB | 2260064 A | 3/1993 |
| WO | WO 91/07044 | 3/1991 |
| WO | WO 92/09178 | 5/1992 |

OTHER PUBLICATIONS

America On Line, "Integrated Voice and Cellular Digital Packet Data (CDPD) Network Analyzer", Jun. 15, 1995.
Wexler, "Moving Toward a Wireless Infrastructure", Computerworld, Oct. 11, 1993.
Wireless, "The Sky's No Limit", Nov. 1993.
Byte, "Cirrus Subsidiary Leads CDPD Push", Nov. 1993.
America On Line, "Audiovox's NVX-800 Cellular Phone", Apr. 19, 1995.
America On Line, "Oracle's Implementation of New Technology", May 8, 1995.
America On Line, "HP Open Mail", May 9, 1995.

(List continued on next page.)

*Primary Examiner*—William Cumming
(74) *Attorney, Agent, or Firm*—James J. Murphy, Esq.; Winstead Sechrest & Minick (57) ABSTRACT

A portable radio telephone handset includes the capability of operating as a data transfer terminal as well as an analog cellular telephone subscriber station. Two modes of operation are available in the handset, an analog cellular communication mode and a Cellular Digital Packet Data (CDPD) mode. A paging function for incoming analog cellular communication is carried out on a CDPD channel. The handset distinguishes between paging signals identifying CDPD mode communications and paging signals identifying analog cellular communications. The handset automatically preempts CDPD communications in favor of analog cellular communications such as those carried out in an AMPS configuration. To maintain the security of the handset ID, AMPS communications can be set up and controlled using CDPD control channels.

8 Claims, 5 Drawing Sheets

U.S. PATENT DOCUMENTS

| | | |
|---|---|---|
| 3,906,166 A | 9/1975 | Cooper et al. |
| 3,976,840 A | 8/1976 | Cleveland et al. |
| 3,976,995 A | 8/1976 | Sebestyen |
| 4,005,388 A | 1/1977 | Morley et al. |
| 4,095,215 A | 6/1978 | Mortimer |
| 4,268,721 A | 5/1981 | Nielson et al. |
| 4,279,021 A | 7/1981 | See et al. |
| 4,352,955 A | 10/1982 | Kai et al. |
| 4,613,990 A | 9/1986 | Halpern |
| 4,661,972 A | 4/1987 | Kai |
| 4,730,187 A | 3/1988 | Menich et al. |
| 4,802,200 A | 1/1989 | Murata et al. |
| 4,812,843 A | 3/1989 | Champion, III et al. |
| 4,825,456 A | 4/1989 | Rosenberg |
| 4,850,006 A | 7/1989 | Sasaki et al. |
| 4,947,420 A | 8/1990 | Stahl et al. |
| 4,962,523 A | 10/1990 | Tanaka |
| 5,008,925 A | 4/1991 | Pireh |
| 5,020,091 A | 5/1991 | Krolopp et al. |
| 5,054,052 A | 10/1991 | Nonami |
| 5,117,449 A | 5/1992 | Metroka et al. |
| 5,119,397 A | 6/1992 | Dahlin et al. |
| 5,128,980 A | 7/1992 | Choi |
| 5,148,473 A | 9/1992 | Freeland et al. |
| 5,153,903 A | 10/1992 | Eastmond et al. |
| 5,166,973 A | 11/1992 | Hoff |
| 5,168,574 A | 12/1992 | Gordon et al. |
| 5,175,758 A | 12/1992 | Levanto et al. |
| 5,195,090 A | 3/1993 | Bollinger et al. |
| 5,199,031 A | 3/1993 | Dahlin |
| 5,202,912 A | 4/1993 | Breeden et al. |
| 5,203,020 A | 4/1993 | Sato et al. |
| 5,212,722 A | 5/1993 | Murata |
| 5,228,074 A | 7/1993 | Mizikovsky |
| 5,247,566 A | 9/1993 | Hiramatsu |
| 5,247,700 A | 9/1993 | Wohl et al. |
| 5,249,218 A | 9/1993 | Sainton |
| 5,253,287 A | 10/1993 | Hasegawa |
| 5,257,401 A | 10/1993 | Dahlin et al. |
| 5,265,270 A | 11/1993 | Stergel et al. |
| 5,274,699 A | 12/1993 | Ranz |
| 5,396,539 A | 3/1995 | Slekys et al. |
| 5,479,479 A * | 12/1995 | Braitberg et al. ............. 379/58 |
| 5,533,019 A * | 7/1996 | Jayapalan ................. 370/58.1 |
| 5,537,441 A * | 7/1996 | Bremer et al. ............. 375/261 |
| 5,544,222 A * | 8/1996 | Robinson et al. ............. 379/58 |

OTHER PUBLICATIONS

Wirbel,"Connecting the Wireless World", Electronic Times, Mar. 1, 1993.

Weber, "PCs On The Go Are Causing a Burst of Activity", Electronic Engineering Times, Mar. 29, 1993.

2,063,901, Application for Canadian Patent for: Cellular Data Overlay System, Slekys et al.

Hidebrant, "Die Basisstation Im Zellularen Funkfernsprech-netz C450", 2323 Telcom Report, 1985, No. 5.

Ehrlich et al., "Advanced Mobile Phone Service", Bell System Technical Journal, vol. 58, No. 1, 1979, N.Y.

Booker, "Cellular Nets to Ride Analog Voice Lines", Computerworld, Jul. 26, 1993.

* cited by examiner

PORTABLE RADIO TELEPHONE DATA TERMINAL USING CDPD

This is a continuation-in-part application of Ser. No. 08/117,913, filed Sep. 8, 1993 now abandoned.

TECHNICAL FIELD

This invention relates generally to wireless voice and data communication systems. More particularly, the invention relates to wireless communication systems integrating voice mode and data mode operations.

BACKGROUND ART

The modern analog cellular system for mobile wireless duplex voice transmission is called "Advanced Mobile Phone Service" (AMPS). The AMPS cellular network uses the FCC assigned carrier frequency range of 800 to 900 MHz. Automobile-mounted cellular units transmit voice signals to a cellular base station within a given cell using up to one watt of power. Hand-held cellular units using battery power supplies transmit voice signals to a cellular base station within a given cell using up to one quarter watt of transmission power.

The analog human voice was the signal that the AMPS system was first designed to communicate. The AMPS system has been optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations whereby a user's signal is handed off to the next cell site as he or she moves into a different cell area. This cellular hand-off can cause a temporary loss in transmission or reception. Temporarily losing a voice signal is not critical because a user knows when there is a signal loss and the voice information can be retransmitted. However, signal loss, even though temporary, poses special problems for transmission of digital data. Some other AMPS cellular problems causing loss in voice signals are drops in signal strength, reflections, Rayleigh fading, and cellular dead spots.

The availability of portable computers naturally results in the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage to using the AMPS system for data transmission is that a narrow channel bandwidth and errors in transmission limit the baud rate for transmitting and receiving the digital data. As previously stated, loss of raw digital data may be caused by other problems in the AMPS mobile cellular system.

Another problem of data transmission with a mobile subscriber station occurs when a subscriber station is moving at the edge of a cell or coverage area. Such circumstances can result in a substantial loss of data, or substantial delays due to the necessity of re-transmitting the data. These problems have been addressed in part by the Cellular Digital Packet Data (CDPD) system described in the CDPD specification, Version 1.1, incorporated herein as background information. Version 1.0 of the CDPD specification is included as Appendix VII of the parent application. The CDPD communication system shares the same carrier frequencies assigned to the AMPS channels as indicated in the subject CDPD specification.

Figure 1:
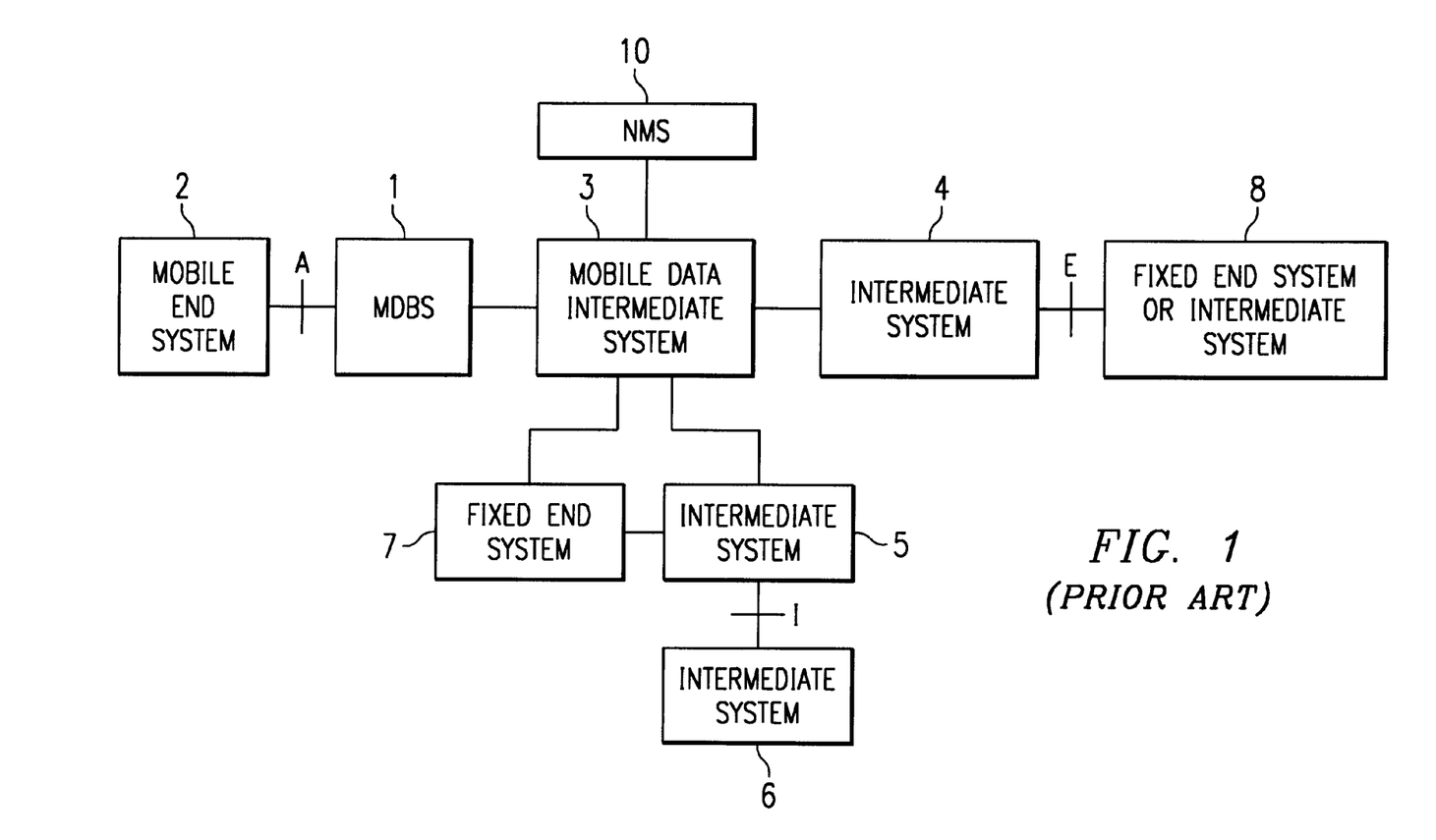
FIG. 1 is a block diagram of a CDPD system.

The base unit or mobile data base station (MDBS 1, as illustrated in FIG. 1), of an exemplary CDPD system utilizes a channel within an AMPS cell to establish an RF link and communicate to a user's mobile end system. The MDBS may use other frequencies outside of AMPS that are made available to it by service providers. The mobile end system or subscriber station (M-ES 2) is a portable computer, hand-set or other portable electronic device containing a subscriber communication unit. The MDBS serves as a communication link between the user of the M-ES 2 and a service provider's network of wire lines, microwave links, satellite links, AMPS cellular links, or other CDPD links (such as mobile data intermediate system MD-IS 3, intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD transmitter/receiver in a particular sector (transmitting range and area of a standard AMPS base station transceiver).

The airlink interface portion of the CDPD network consists of a set of cells. A cell is defined by the geographical boundaries within which the RF transmission between an M-ES and an MDBS are received at acceptable levels of signal strength. It is not sufficient that the subscriber receive an adequate signal level. The base station must also receive a good signal from the subscriber station (M-ES) for the subscriber to be considered within the cell. The transmitter supporting the cell may be located centrally within the cell, with transmission being carried out via an omni-directional antenna, or the transmitter located at the edge of a cell and transmission carried out via a directional antenna. This second type of cell is also referred to as a sector. In typical configurations, the transmitters for several sectors are co-located. The area served by a set of cells has some area overlap, so that a moving mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the mobile end system 2 and the MDBS 1 is an "air interface" constituted by a radio frequency link using standard AMPS frequencies. The MDBS 1 is connected to other mobile data base stations through various public and private data networks. One example is mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one sub-network to another. The mobile data MD-IS 3 performs data packet routing based on knowledge of the current location of each mobile end system within the range of the mobile data base stations under the control of the MD-IS. The MD-IS is usually the only network entity that is "aware" of the location of any of the mobile end systems. However, under some circumstances (as defined by the CDPD specification) particular mobile database stations will keep track of the behavior of specific subscriber stations. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under the proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. The functions and protocol as carried out by each of the mobile end systems and the mobile data base station are explained in greater detail in the CDPD specification, Parts 402 and 403.

Figure 2:
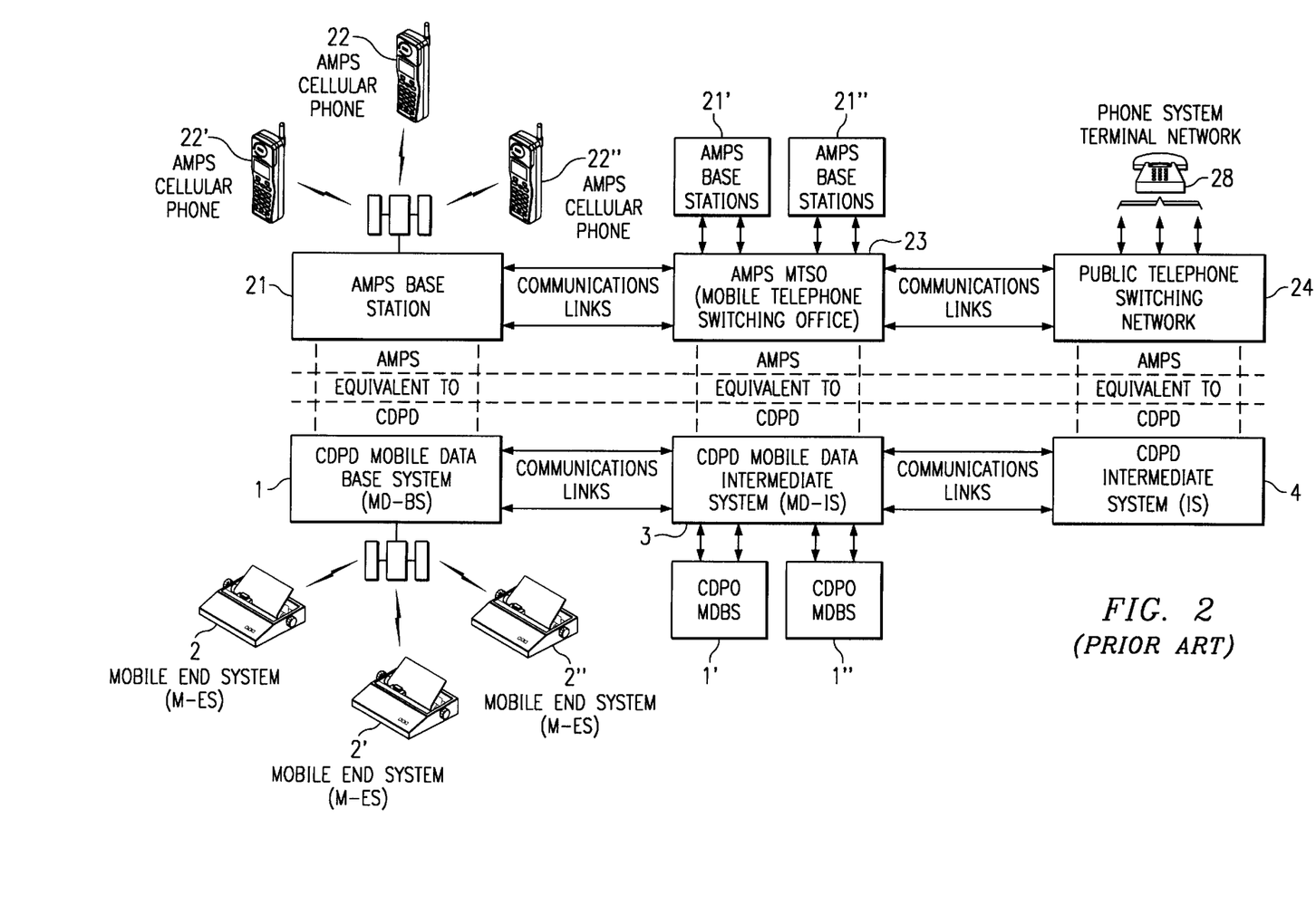
FIG. 2 is a block diagram correlating the CDPD system to an accompanying AMPS system.

FIG. 2 provides a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22' and 22" for AMPS users. Also, the MDBS 1 is preferably located with the AMPS base station 21.

The MD-IS 3 which acts as a local controller for the CDPD mobile data base stations connected thereto is equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is located (preferably) at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party through a PSTN 24. The intermediate system 4 of the CDPD roughly corresponds to the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

In general, the CDPD system illustrated in FIG. 1 operates to provide service to manage data communications to subscribers over a wide geographic range. When a mobile end system or subscriber station is located, data packets are routed directly to and from it by the MD-IS via the MDBS. The route via which data packets are forwarded to and from a mobile end system or subscriber station changes when the mobile end system moves.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber station's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmission from the base station to the subscriber station M-ES are continuous. Transmissions from subscriber station M-ES to the MDBS use a burst mode in which subscriber station M-ES only accesses a channel when it has data to send and the channel is not being used by other mobile subscriber stations. This allows a multiple mobile subscriber stations to share a single channel, and for data transmission characterized by intermittent transactions of relatively small amounts of data, thereby greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and very good error performance in cellular channels. The fact that the choice of modulation was not constrained by a preexisting signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently the raw (baseband) digital data being transferred across CDPD include electronic mail messages, digital fax data, or digital data representing a network connection such that files may be transferred as if currently connected to a local area network.

The mobile data intermediate system MD-IS 3 handles the routing of packets for all visiting mobile end systems in its serving area. Two services are performed by the MD-IS: a registration service maintaining an information base of each M-ES currently registered in a particular serving location; and, a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and to detect the onset of voice traffic on the channel currently being used for CDPD communication. If an AMPS cellular unit begins transmitting on a channel occupied by a CDPD communication, the CDPD unit ceases transmitting on that channel and switches to another available channel, or if no other channel is available, ceases transmission until a channel becomes available for CDPD use. This is referred to as channel hopping.

Although the CDPD system shares existing AMPS radio frequency channels, as stated above, AMPS calls are given first priority, and they are always able to pre-empt the use of any channel being used by CDPD. However, the cellular service provider may opt to dedicate one or more channels to CDPD usage. In this case, AMPS calls will never attempt to pre-empt the particular channels dedicated to CDPD use.

In a normal operation of the MDBS carrying out channel hopping, the MDBS monitors activity on AMPS channels. The MDBS maintains a list of the status (occupied voice or unused) for each channel available for CDPD use at the cell. The MDBS selects a channel for CDPD use from the unused channels in the list based on a combination of criteria (not specified in the CDPD standard). These could include such considerations as: the likelihood that the channel will be required by the voice system in the near future; the amount of interference present on the channel; the amount of interference that the CDPD communication is likely to cause to other voice users in different cells, or on other sectors; or, other factors. The MDBS transmits a list of all channels available for CDPD use (whether currently occupied by a voice communication or not) to the subscriber stations. The MDBS may execute a channel hop before the channel is pre-empted by AMPS communication if the MDBS determines that another channel is more suitable. In such a case, the MDBS sends a message to the subscriber stations commanding them to change to the specific channel selected, and then the MDBS executes the hop. This sort of hop is much more orderly and efficient since the subscriber stations do not have to search for the next channel.

If the present CDPD channel is pre-empted by AMPS communication, the MDBS selects another channel from those unused by AMPS communications and immediately hops to it without informing the subscriber station. The subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system; RF power amplifiers (in particular, linear amplifiers can be shared with existing AMPS), RF multicouplers; power splitters; duplexers; and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

In a normal operation, when a subscriber station supporting AMPS and CDPD is activated, it immediately scans for control channels to conduct registration on a particular communication system. This is true for both AMPS and CDPD systems. Consequently, such handset will carry out two registration operations upon activation. The first is a scanning for an AMPS control channel so that the handset can be assigned an AMPS voice channel. The second operation is a scanning for a CDPD channel to facilitate assignment of a CDPD data channel once registration is carried out. Thus, a registration takes place with both a mobile data base station and an AMPS base station. These registration operations are independent of each other as is the circuitry of the MDBS and the AMPS base station, even though the two base stations may be co-located with each other.

This redundant operation imposes a burden upon the subscriber station handset complicating the overall process. Further, AMPS registration takes place over non-protected radio links, exchanging all the necessary identification data that is proprietary to a particular handset. Recently, it has become a common practice to intercept the AMPS identification data during the registration, and use that data to program another handset thereby charging the air time to the original subscriber whose registration transmission was intercepted. This illegal practice has become so widespread as to undermine confidence in cellular telephone systems. Further, both AMPS and CDPD systems have their respective strengths. However, there is currently no technique or system which capitalizes on the strength of one system to aid the operation of the other. Thus, a true synergy of the two systems has heretofore been lacking in the conventional technology.

DISCLOSURE OF THE INVENTION

An advantage of the present invention is the exploitation of the capabilities of AMPS and CDPD subscriber stations where one mode of communication enhances the other.

An additional advantage of the invention is the protection of identity data from mobile stations during the set-up of AMPS communications.

Yet another advantage of the invention is the simplification of encoding key portions of AMPS communications.

Still an additional aspect of the present invention is the facilitation of control data exchange between AMPS communications systems and CDPD communication systems.

The aforementioned advantages are achieved in a first aspect of the invention using a portable radio telephone data terminal including means for controlling Cellular Digital Packet Data (CDPD) communication by use of at least one CDPD channel and means for controlling analog cellular communications by use of at least one CDPD channel.

In another aspect a method for setting up analog cellular calls in an AMPS system is used to maintain the security of AMPS data associated with the mobile station. The AMPS system must be associated with a CDPD system so that scanning for a CDPD channel and identifying a CDPD channel is possible. Once this is done, the AMPS data, including an identity number of the mobile station is sent to the CDPD base station over the CDPD channel. This identity number includes AMPS information associated with that mobile station which is used for setting up the AMPS call. Finally, the AMPS data associated with the mobile station is sent from the CDPD base station to an AMPS base station.

A further aspect of the invention is a voice/data communication system including an AMPS portion and a CDPD portion. Each of these portions is constituted by a plurality of base stations to carry out communications with a plurality of portable radio telephone devices. Each type of base station is controlled by a respective type of switching office. Each of the switching offices is connected to an external communication network. The key improvement of the inventive system is the means for exchanging AMPS data between a CDPD base station and one of the mobile radio telephone stations over a CDPD channel.

BEST MODE FOR CARRYING OUT THE INVENTION

Figure 3:
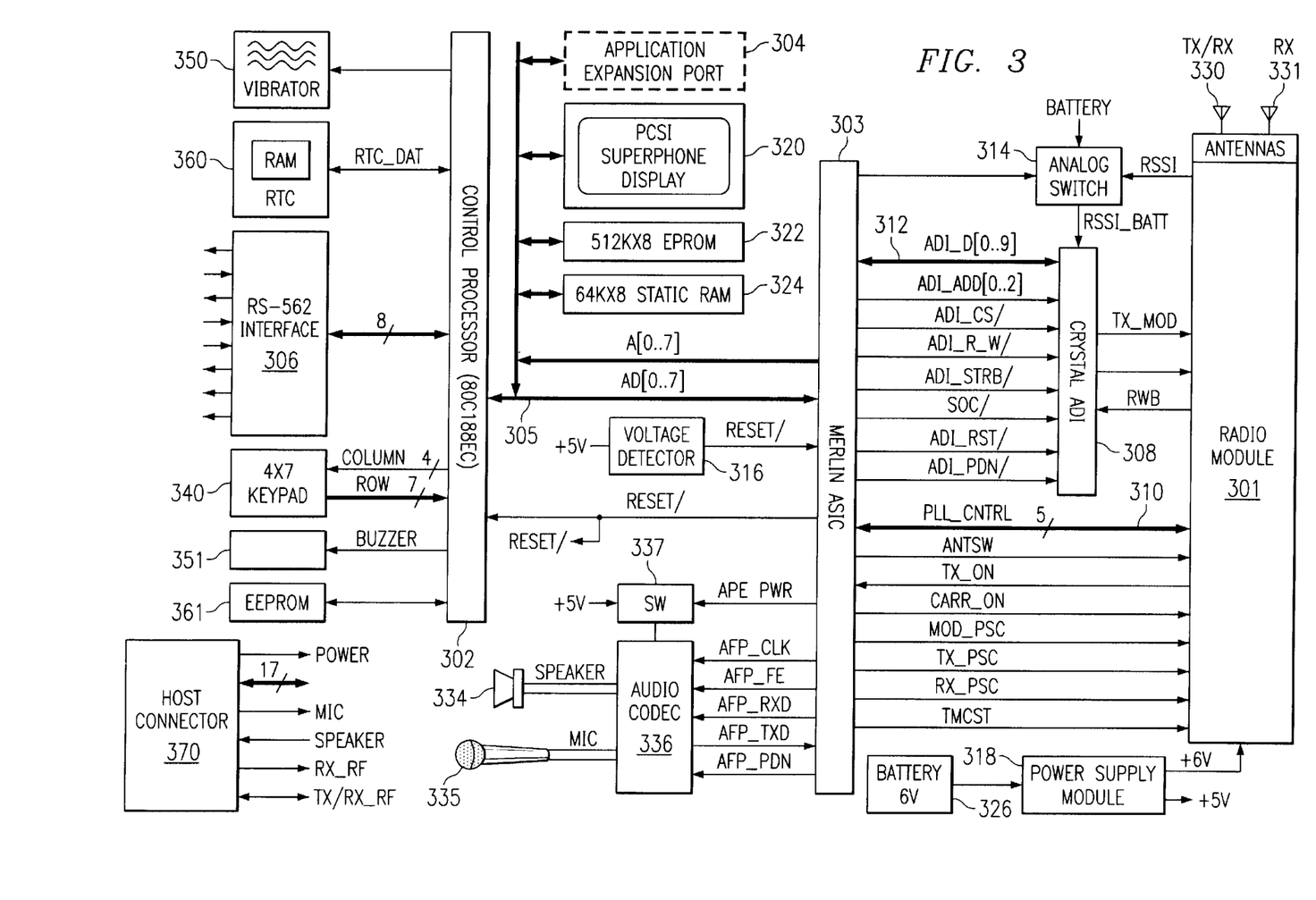
FIG. 3 is a block diagram illustrating discrete hardware components being included in the portable radio telephone handset.

Integration of cellular voice communication and data communication so that one type of communication enhances the other is facilitated by the device of FIG. 3, illustrating a block diagram of a portable communication terminal handset 100. In most respects this portable communication terminal is similar to conventional portable radio telephone handsets in that it includes a radio frequency module 102 having at least one radio frequency transceiver. The radio frequency transceiver uses a main antenna 104 for both receiving and transmitting the various types of signals handled by the portable terminal, such as Advanced Mobile Phone System (AMPS) data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal or subscriber station can also be patched into a local public switch telephone network (PSTN) by way of a digital-analog access interface (DAA) connected to the radio control processor 108. This processor along with control processor and modem 109 divides the various control functions of the portable terminal including call setup, high level protocol, low level protocol, power adjustment, modem operation and data transfer between an external host computer. To facilitate ease of subscriber use, the host computer can be a personal computer (PC) or personal digital assistant (PDA) or other electronic device.

Figure 4:
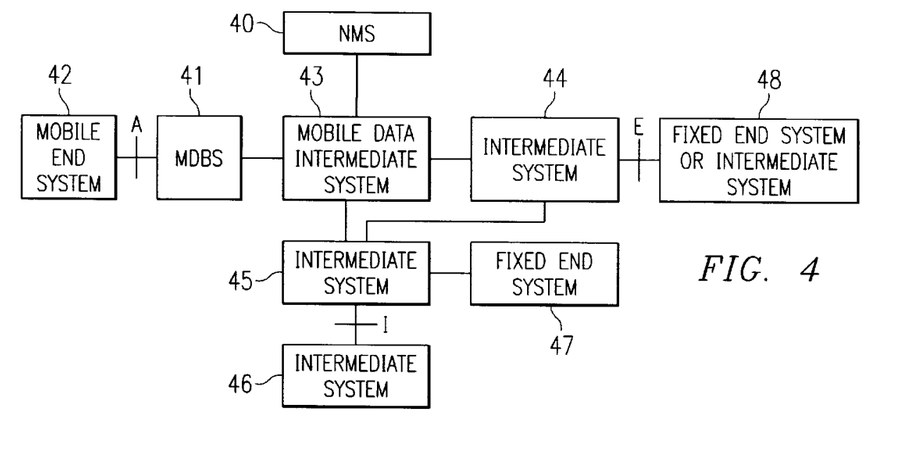
FIG. 4 is a block diagram depicting the discrete components constituting the elements of FIG. 3.

The specific components constituting the block diagram of FIG. 3 are depicted by the block diagram of FIG. 4. Included is a common radio module 301 and common processing means, constituted by control processor 302 and Merlin ASIC processing chip 303 for carrying out the functions of both the AMPS and CDPD communication modes. The processor chips 302, 303 are fully described in Appendix IV of the parent application and divide the control functions of the portable terminal to effect the conversion between the AMPS communication mode and the CDPD communication mode. An application expansion port 304 feeds the data link 305 between the two processor chips 302, 303 in order to allow additional applications to be carried out by the processor chip pair using additional programmed chips.

The two processor chips 302, 303 are also meant to receive data and programming instructions from an external computer through RS-562 interface 306. For ease of operation, this external programming means would be a personal computer (PC). An internal modem (not shown) can be included as part of the function of the two processor chips 302, 303. Preferably, the computer connected through interface 306 would be a portable device such as a portable digital assistant (PDA) so as to maintain the mobility of the overall data communication terminal handset. Host interface 306 can be a serial interface that would accept digital data to be modulated and transmitted via radio module 301.

Processor chip 303 controls the phase lock loop of radio module 301 through data line 310. Conversion of analog signals from radio module 301 into digital signals appropriate for processor chip 303 is carried out by analog-digital and digital-analog interface 308. The converted signals are carried between interface 308 and processor chip 303 by way of data trunk 312.

Power supply module 318 can be fed by a six volt battery (not shown) in some other power source. The power supply module provides a number of different power levels commensurate with the type of operation carried out by the portable data terminal 100.

The overall power drain is most affected by radio module 301 which preferably contains at least one radio frequency transceiver. Normally this transceiver would operate in a frequency range of 824.040–848.970 MHz at a maximum power output of 0.6 watt. Further radio frequency standards are listed on page 11 of Appendix VI and coincide with the radio frequency standards of the MDBS described in Appendix I and the CDPD system description of Appendix VII, all attached to the parent application. Radio module 301 has a diversity antenna arrangement including transmit/receive antenna 330 and receive antenna 331. This arrangement is used for a switchover when multipathing occurs in order to maintain the quality of the reception to radio module 301. From the signals received by radio module 301, RSSI (signal strength) data is derived and processed in interface 308 and processor chip 303. The RSSI data is displayed on the handset display 320 at least four times per second when the RSSI signal is routed to the display by means of analog switch 314.

As previously indicated, the control function of the portable data terminal is divided between processor chips 302 and 303. Chip 303 handles the power-down process occurring when the handset goes into the dormant "sleep" mode. Chip 303 also handles lower level protocol for most functions handled by both of the processor chips. Modem communication over an AMPS channel is also controlled by chip 303. Voice communication is effected using speaker 334 and microphone 335 connected to audio codec 336, which in turn is connected to processor chip 303 to receive the appropriate signals for audio communication.

Processor chip 302 handles call set up as well as high level CDPD protocol. DMA and UART functions are also handled by processor chip 302. Data is input by the user into the system by means of a 4×7 key pad 340. Preferably, all switches of the key pad 340 are a single pull, single throw switches with momentary contact. The key pad is usually provided with backlighting for user convenience.

Additional memory is constituted by any suitable device such as an EPROM or static RAM. When a paging signal is received by the handset, the user can be advised by means of vibrator 350 or buzzer 351, both connected to processor chip 302. Additional memory capacity can also be provided to the coupled processor chips 302, 303 by means of either RAM 360 or EEPROM 361.

Host connector 370 is used to transfer audio frequency and radio frequency signals from the handset to a host cellular terminal such as would be found in an automobile. By placing the handset in an appropriate cradle included with the host terminal, it is possible for the handset to be used in "hands-free" operation if the host terminal supports this function. The pin arrangement of host connector 370 is specified on pages 16–23 of Appendix VI of the parent application. An additional telephone type handset can be connected to the portable data terminal through host connector 370.

Figure 5:
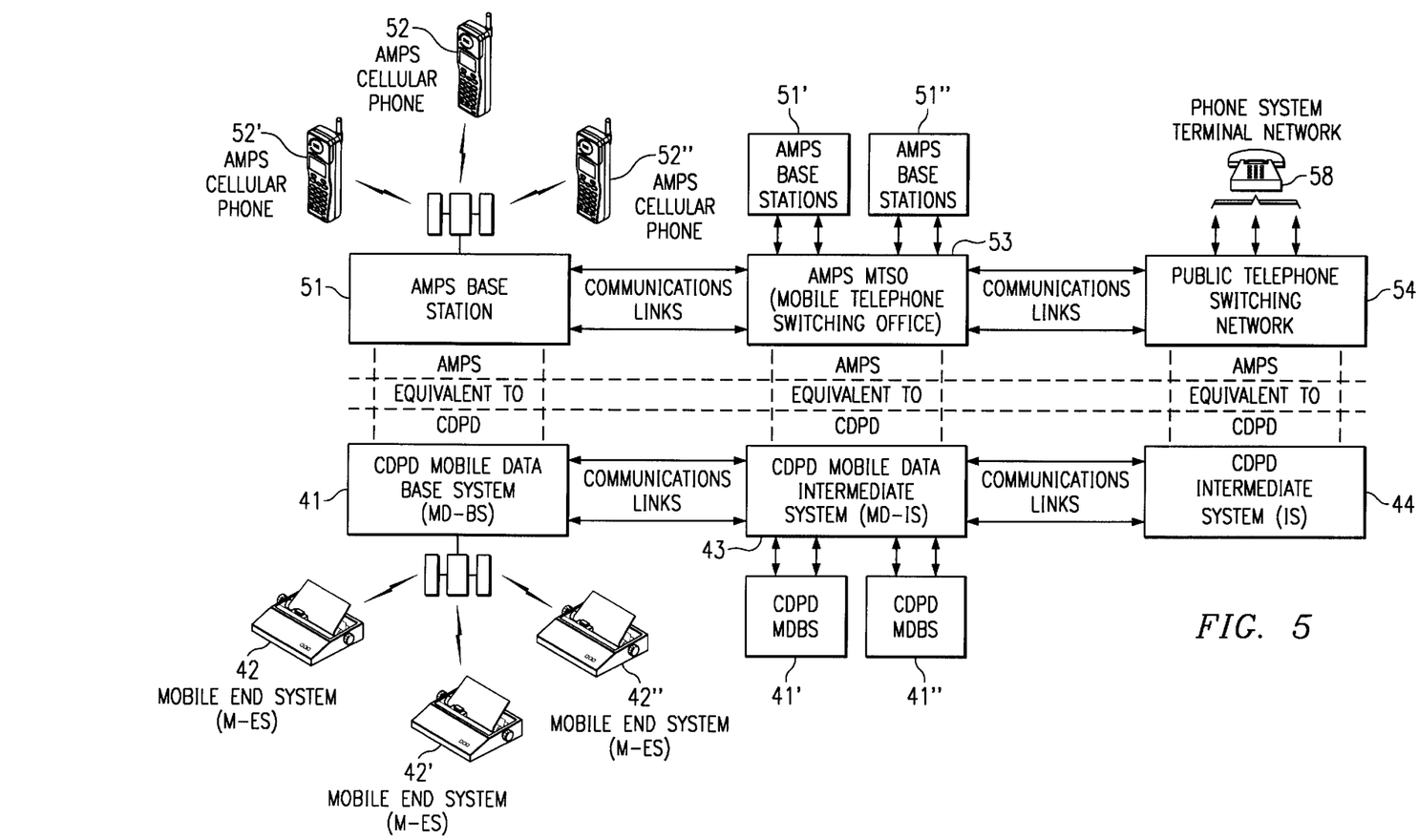
FIG. 5 is a block diagram depicting an expanded relationship between a CDPD system and an AMPS system.
Figure 6:
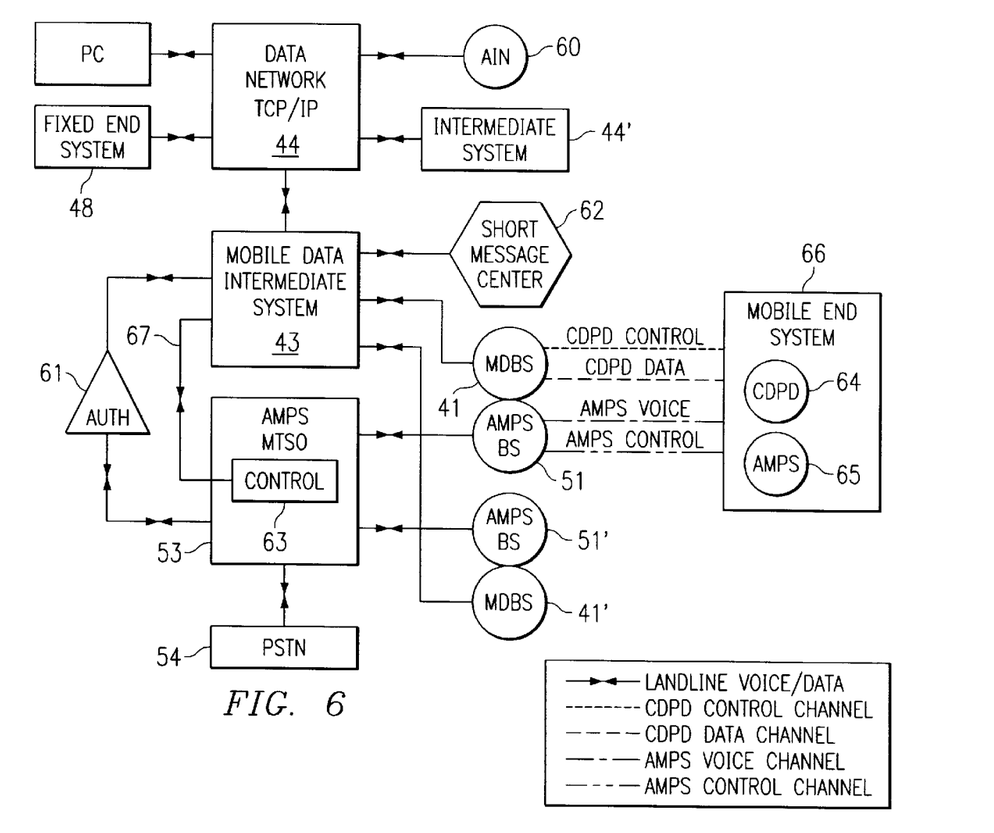

The characteristics of the aforementioned handset and local data base stations facilitate additional features on a system wide basis. In particular, the characteristics of the handset and MDBS permit a new relationship between CDPD systems and corresponding AMPS systems. This new relationship is illustrated in FIG. 5.

Normally, the MD-IS 43 of a CDPD system is isolated from AMPS MTSO 53 even though the two can be co-located. In the conventional art, AMPS control and CDPD control are separate functions even if circuitry in the handset 42 can handle both. However, in the system of the present invention, MD-IS 43 is linked to control portion 63 of MTSO 53 via a data link 67. Like most data links, 67 is constituted by a landline data link. This link in conjunction with the proper programming of the processors in the MD-IS 43 and MTSO 53 permit control functions to be exchanged between MD-IS 43 and MTSO 53. This exchange can include the substitution of the control functions of MD-IS 43 for those of MTSO 53.

It is noted that MD-IS 43 and MTSO 53 are connected to authorization platform 61 via data links. Authorization platforms are well known and would be used to verify PIN numbers or decode encrypted messages. However, with link 67, the data links authorization platform 61 from both MD-IS 43 and MTSO 53 are no longer necessary. Only one would require data link authorization platform 61 since the necessary verification data from the authorization platform would be shared with the other via data link 67.

A data link also exists within mobile end station 42. This is a software link 66 depicted between CDPD functional portion 64 and AMPS functional portion 65. As previously explained, these functional portions are not separate circuits but rather programming used by both processors in the handset depicted in FIGS. 3 and 4. Software link 66 allows the substitution of one control function for another. For example, CDPD control can be substituted for AMPS control, using CDPD control channels to carry out the AMPS control functions. Thus, in conjunction with software changes and data line between MD-IS 43 and MTSO 53, set up and control of AMPS communication can be conducted with a properly programmed handset 42.

The arrangement of FIG. 5 permits the enhancement of the AMPS system by the CDPD system. One advantage to be gained is through the use of a CDPD channel to carry AMPS call set up data, including the identity data of the subscriber station handset. Since CDPD communications are encoded and because of this encoding and the particular protocols using CDPD communication systems, full interception and encryption of CDPD communications by unauthorized users is very difficult. Thus, illegal interception of the AMPS registration messages modulated on a CDPD channel in accordance with Part 408 of the CDPD specification would provide no useful data to the potential thief. The handset 42, base stations 41, 51 and switching offices 43, 53 can be programmed for the necessary protocol to include the AMPS registration data along with the CDPD registration message. The CDPD control of the AMPS communication of the present invention is preferably limited to those steps in which critical identification information regarding the handset 42 would normally be exchanged with the AMPS base station 51. However, there is no reason that complete set-up of an AMPS call, including hand-off and de-registration upon conclusion of the call cannot be performed using the CDPD control channels. The only drawback would be that extensive AMPS communication could over-burden the CDPD control channels. Consequently, there would be the need for an algorithm to balance the amount of AMPS control that was carried out on the CDPD control channels. One solution would be the allocation for CDPD use of channels normally allocated to AMPS.

The simplest way of carrying out this technique is to program handset 42 to delete the scanning for an AMPS control channel and to provide AMPS data with the CDPD registration. This information would be sent to mobile data base station 41 via CDPD control channel, and from there to MD-IS 43. Additional programming of the MD-IS to provide a protocol to separate the AMPS data from the CDPD data. Such protocols are well known to those skilled in the art of data communication, and thus, would require very little effort to carry out the necessary reprogramming. The AMPS data is sent over data link 67 to the AMPS MTSO 53 controller 63. The MTSO 53 would then allocate a voice channel for AMPS communication for handset 42. This channel assignment could be sent via AMPS base station 51 over an AMPS control channel, or the channel assignment data could be sent back over data link 67 through MD-IS 43, and to MDBS 41 for transmission over the CDPD control channel. The exact point at which full communication for AMPS would take place solely between the AMPS base station and handset 42 would be left up to the communication system operator. The key to this technique is that non-encrypted AMPS communication not contain critical handset identity information. Rather, all such communication including such data should be conducted over the encrypted CDPD control channel.

MD-IS 43 can be further programmed for additional levels of encryption in a manner already well known in the data transmission art. In the alternative, MD-IS 43 can rely upon intelligent peripherals or authorization systems such as authorization platform 61 to provide additional levels of security using higher order encryption techniques. These are also techniques already well known in the data communication art.

Short message center 62 is linked to MD-IS 43. The use of message center 62 allows short messages to be retained within the CDPD system during the CDPD sleep mode. When the handset periodically comes out of the sleep mode to check for message, an indication will be sent from the base station that a short message can be downloaded to the handset.

MD-IS 43 is also connected to data network 44 using TCP/IP protocol. This data network can be connected to other data networks which is IS 44' or to fixed end users such as F-ES 48. The data network can also be accessed using a personal computer 68. The protocols covering such data transfers are all well known in this art. In addition, data network 44 can interface with common Channel Interoffice Signaling System (CCIS) of an Advanced Intelligent Network (AIN) 60 for a landline telephone system. A description of such systems is found in U.S. Pat. No. 5,247,571 to Kay et al., incorporated herein by reference. Data network 44 and the CCIS of the AIN use different protocols. However, communication between two such systems can be carried out by translating protocols, and reaching an administrative agreement between carriers. An arrangement whereby the MD-IS is connected to the AIN through data network 44 would result in additional calling features available on the AIN being applicable to the MD-IS with the proper protocol translations. Further, communication carried out by the AIN with additional entities such as credit authorization systems would also be available to the MDIS. Since the MD-IS contains a data link 67 with AMPS MTSO 53, all such data could then be available to the AMPS system associated with the CDPD system.

The CDPD system has the capability of easily interfacing with existing AMPS systems and sharing some front-end equipment with the existing AMPS system. To take advantage of this capability the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside of the MDBS which is normally shared with the AMPS system. Thus, the MDBS must be easily connectable to the following pieces of external equipment found in the AMPS base station: an antenna system; RF power amplifiers (in particular, linear amplifiers can be shared with existing AMPS), RF multicouplers; power splitters; duplexers; and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

The same conditions can apply to the co-location of the MD-IS and the MTSO controlling AMPS communication. While co-location of the MD-IS and the MTSO is not necessary for the operation of the present invention, such co-location can be very beneficial by reducing the length of data links.

Although a number of arrangements of the present invention have been mentioned by way of example, it is not intended that the invention be limited thereto. For example, the present invention can be adapted with the appropriate use of its expansion ports and connection to systems having the appropriate characteristics to support electronic mail, a modem emulation mode, TCP-IP connections, call screening, automatic paging acknowledgement including messaging, and location functions. Accordingly, this invention should be considered to include any and all configurations, modifications, variations, combinations or equivalent arrangements following within the scope of the following claims.

We claim:

1. A portable radio telephone data terminal comprising;

(a) means for controlling Cellular Digital Packet Data (CDPD) communication by use of at least one CDPD channel;

(b) means for controlling analog cellular communications by signaling over at least one CDPD channel comprising Advanced Mobil Phone Services (AMPS) circuitry and CDPD circuitry and wherein said means for controlling said analog cellular communicatons and said means for controlling CDPD communications are arranged in a common portable housing;

(c) means for converting call set up data for AMPS communication to a CDPD channel;

(d) means for recognizing AMPS call set up data on a CDPD channel;

(e) means for converting said AMPS call set up data for use in AMPS communication; and (f) means for distinguishing a paging signal relating to CDPD communications from a paging signal relating to analog cellular communications.

2. The portable radio telephone data terminal of claim 1 wherein said means for controlling said analog cellular communications and said means for controlling a CDPD communication, comprise common radio frequency transceiver circuitry.

3. The portable radio telephone data terminal of claim 2, further comprising a serial interface arranged for connection to a host computer to accept digital data to be modulated and transmitted over said common radio frequency transceiver circuitry.

4. The portable radio telephone data terminal of claim 3, wherein said transceiver circuitry includes switch-over means for compensating for multipath conditions.

5. The portable radio telephone data terminal of claim 4, wherein said switch-over means comprise a diversity receiving antenna in a shared transmitting/receiving antenna.

6. The portable radio telephone data terminal of claim 1, further comprising means determining identity data contain din a paging signal.

7. The portable radio telephone data terminal of claim 6, further comprising means for recognizing said identify data and providing control signals responsive to said recognition.

8. The portable radio telephone data terminal of claim 6, further comprising means for interrupting communication in the CDPD mode in response to detection of a paging signal indicative of operation in said analog cellular mode.

* * * * *